United States Patent
Kim et al.

(10) Patent No.: US 12,319,350 B2
(45) Date of Patent: Jun. 3, 2025

(54) PLASTIC COMPOSITE MATERIAL PANEL AND MANUFACTURING METHOD THEREOF

(71) Applicants: Hyundai Motor Company, Seoul (KR); Kia Corporation, Seoul (KR)

(72) Inventors: Minsoo Kim, Suwon-si (KR); Joonghyun Shin, Hwaseong-si (KR); Won Ki Song, Seongnam-si (KR); Hyuncheol Yun, Seoul (KR); Hyunyi Kwon, Ulsan (KR); Jai Hak Kim, Gunpo-si (KR); Woojin Kim, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 302 days.

(21) Appl. No.: 17/988,911

(22) Filed: Nov. 17, 2022

(65) Prior Publication Data

US 2023/0085084 A1 Mar. 16, 2023

Related U.S. Application Data

(63) Continuation-in-part of application No. 17/468,000, filed on Sep. 7, 2021, now Pat. No. 11,760,419.

(30) Foreign Application Priority Data

Jan. 11, 2021 (KR) .................. 10-2021-0003308
Nov. 22, 2021 (KR) .................. 10-2021-0161013
Aug. 26, 2022 (KR) .................. 10-2022-0107762

(51) Int. Cl.
*B62D 25/06* (2006.01)
*B62D 29/04* (2006.01)

(52) U.S. Cl.
CPC ........... *B62D 25/06* (2013.01); *B62D 29/043* (2013.01)

(58) Field of Classification Search
CPC ........ B62D 25/02; B62D 25/04; B62D 25/06; B62D 29/001
USPC .............. 296/193.05, 203.01-4, 901.01, 210
See application file for complete search history.

(56) References Cited

U.S. PATENT DOCUMENTS

| | | |
|---|---|---|
| 5,988,074 A | 11/1999 | Thoman |
| 8,172,308 B2 | 5/2012 | Schmidt et al. |
| 8,511,742 B2 | 8/2013 | Legler et al. |
| 11,208,151 B2 | 12/2021 | Dominic |
| 2016/0318557 A1 | 11/2016 | Kim et al. |

FOREIGN PATENT DOCUMENTS

| | | |
|---|---|---|
| CN | 107010119 A | 8/2017 |
| CN | 208360178 U | 1/2019 |
| CN | 110696926 A | 1/2020 |
| DE | 3124975 A1 | 1/1983 |
| JP | S6218369 A | 1/1987 |
| JP | S62194980 A | 8/1987 |
| JP | 2009220651 A | 10/2009 |
| JP | 2016210398 A | 12/2016 |

*Primary Examiner* — Dennis H Pedder
(74) *Attorney, Agent, or Firm* — SLATER MATSIL, LLP

(57) ABSTRACT

A plastic composite material panel is disclosed. An embodiment of a plastic composite material panel includes a roof plate portion that includes a molding sheet on which a plurality of resin layers are stacked. A reinforcing layer is formed on the molding sheet and is designed to be bonded to a vehicle body frame. A material filling portion is formed at an end of an edge of the roof plate portion by the reinforcing layer.

7 Claims, 14 Drawing Sheets

(a)

(b)

PLASTIC COMPOSITE MATERIAL PANEL AND MANUFACTURING METHOD THEREOF

CROSS-REFERENCE TO RELATED APPLICATIONS

This application claims priority to and the benefit of Korean Patent Application No. 10-2021-0161013, filed in the Korean Intellectual Property Office on Nov. 22, 2021, and Korean Patent Application No. 10-2022-0107762, filed in the Korean Intellectual Property Office on Aug. 26, 2022, and is also a continuation-in-part of U.S. patent application Ser. No. 17/468,000 filed on Sep. 7, 2021, which claims priority to and the benefit of Korean Patent Application No. 10-2021-0003308 filed in the Korean Intellectual Property Office on Jan. 11, 2021. Each of these applications are incorporated herein by reference in their entirety.

This application is related to U.S. patent application Ser. No. 17/957,301 filed on Sep. 30, 2022, which is also a continuation-in-part of U.S. patent application Ser. No. 17/468,000. This application is also incorporated herein by reference.

TECHNICAL FIELD

An embodiment of the present invention relates to a plastic composite material panel.

BACKGROUND

Recently, the vehicle industry has been introducing a new concept of future mobility vision for realizing a human-centered and dynamic future city. One of these future mobility solutions is a PBV vehicle as purpose-based mobility.

The PBV vehicle is an environment-friendly mobility solution that provides a customized service for passengers during a period in which they travel on the ground to their destination, and it may use an electric vehicle (EV)-based artificial intelligence to set an optimal route for each situation and may also group-drive.

A vehicle body of the PBV vehicle includes an underbody (referred to as a rolling chassis or skateboard in the art) and an upper body mounted on the underbody.

Typically, the upper body includes a vehicle body frame made of steel material, and a plurality of outer panels made of steel material assembled to the vehicle body frame. In recent years, in order to reduce the weight of the vehicle body, the plurality of outer panels made of a steel material have been replaced with a plurality of plastic composite material panels.

The plurality of plastic composite material panels are manufactured by molding the plastic composite original material into a shape set through a mold. The plurality of plastic composite material panels may be coupled to the vehicle body frame with bolts and nuts, or with adhesive.

However, in order to apply the plurality of plastic composite material panels to the vehicle body frame, it is necessary to minimize an application area of the plurality of plastic composite material panels to reduce cost and simplify an assembly process thereof.

Furthermore, according to the conventional art, as a bent shape portion (undercut portion) of the plurality of plastic composite material panels is caught in a molding portion of the mold, the plurality of plastic composite material panels may not be smoothly taken out from the mold.

Furthermore, the plurality of plastic composite panels have disadvantages in that they lack rigidity and are vulnerable to thermal deformation when compared to a panel made of a steel material.

The above information disclosed in this Background section is only for enhancement of understanding of the background of the invention, and therefore it may contain information that does not form the prior art that is already known in this country to a person of ordinary skill in the art.

SUMMARY

Embodiment of the present invention relate to a plastic composite material panel. Particular embodiments relate to a plastic composite material panel that is bonded to a vehicle body of a purpose built vehicle (PBV) and a manufacturing method thereof.

Embodiments of the present invention have been made in an effort to provide a plastic composite material panel that may minimize an application area of a plurality of outer panels made of a plastic composite material assembled to a vehicle body frame and may have increased rigidity.

In addition, embodiments of the present invention have been made in an effort to provide a manufacturing method of a plastic composite material panel that may increase moldability of the plastic composite material panel.

An embodiment of the present invention provides a plastic composite material panel, including: i) a roof plate portion that includes a molding sheet on which a plurality of resin layers are stacked, and a reinforcing layer formed on the molding sheet, and that is bonded to a vehicle body frame; and ii) a material filling portion formed at an end of an edge of the roof plate portion by the reinforcing layer.

The material filling portion may be formed in an undercut portion of an end of an edge of the molding sheet.

The roof plate portion may include a roof skin section and a roof extension section that extends from an edge of the roof skin section and in which the material filling portion is formed.

The roof plate portion may include a first bonding section formed on the reinforcing layer at a lower portion of an edge of the roof skin section and bonded to the vehicle body frame through an adhesive, and a second bonding section formed on the reinforcing layer at a lower portion of an edge of the roof extension section and bonded to the vehicle body frame through an adhesive.

The roof plate portion may include a vehicle body seating section that is formed in the reinforcing layer to have a smaller thickness than the first bonding section and the second bonding section and is formed between the first bonding section and the second bonding section in the roof extension section.

The vehicle body seating section may be seated on a protrusion portion protruding upward from the vehicle body frame.

The material filling portion may be provided to have a shape having a cross-sectional width being gradually decreased from an upper side to a lower side.

The reinforcing layer may include a polyurethane compound and a fiber material.

Another embodiment of the present invention provides a manufacturing method of a plastic composite material panel, including: (a) manufacturing a molding sheet by thermo-forming a multi-layered sheet on which a plurality of resin layers are stacked through a fixed die and at least one first sliding die; and (b) manufacturing a plastic composite material panel in which a reinforcing layer and a material filling portion are formed on the molding sheet by press-molding the molding sheet coated with a reinforcing source through a lower die and an upper die.

In step (a), the at least one first sliding die may be slidably moved in an oblique direction in the fixed die, and the molding sheet in which an undercut portion and an extension extending from the undercut portion are formed at an edge portion thereof may be taken out.

In step (a), the extension may be removed by post-processing.

In step (b), the molding sheet may be loaded onto the lower die in which a first molding surface configured to mold a roof skin section and a second molding surface configured to mold a roof extension section are formed, and the reinforcing source may be applied to the molding sheet.

In step (b), an upper die in which a first molding groove configured to mold a first bonding section, a second molding groove configured to mold a second bonding section, a molding protrusion configured to form a vehicle body seating section, and a third molding groove configured to mold a material filling portion are formed along an up-down direction may be combined with the lower die.

In step (b), the upper die may be released from the lower die, and the plastic composite material panel may be taken out in an upward direction.

In step (b), a first molding surface configured to mold a roof skin section, and a second molding surface configured to mold a roof extension section may be formed, the molding sheet may be loaded on the lower die on which at least one second sliding die is installed, and the reinforcing source may be applied to the molding sheet.

In step (b), an upper die in which a first molding groove configured to mold a first bonding section, a second molding groove configured to mold a second bonding section, and a molding protrusion configured to form a vehicle body seating section are formed along an up-down direction may be combined with the at least one second sliding die in which a third molding groove configured to mold the material filling portion is formed and the lower die.

In step (b), the upper die may be released from the lower die, the at least one second sliding die may be slidably moved in a horizontal direction, and the plastic composite material panel may be taken out in an upward direction.

In step (b), the extension may be removed from the plastic composite material panel by post-processing.

According to the embodiments of the present invention, it is possible to increase rigidity and moldability of a plastic composite material panel, and it is possible to reduce a cost thereof and to simplify an assembly process.

In addition, effects that may be obtained or expected from embodiments of the present invention are directly or suggestively described in the following detailed description. That is, various effects expected from embodiments of the present invention will be described in the following detailed description.

BRIEF DESCRIPTION OF THE DRAWINGS

These drawings are for reference only in describing embodiments of the present invention, and therefore the technical idea of the present invention should not be limited to the accompanying drawings.

DETAILED DESCRIPTION OF ILLUSTRATIVE EMBODIMENTS

Figure 1:
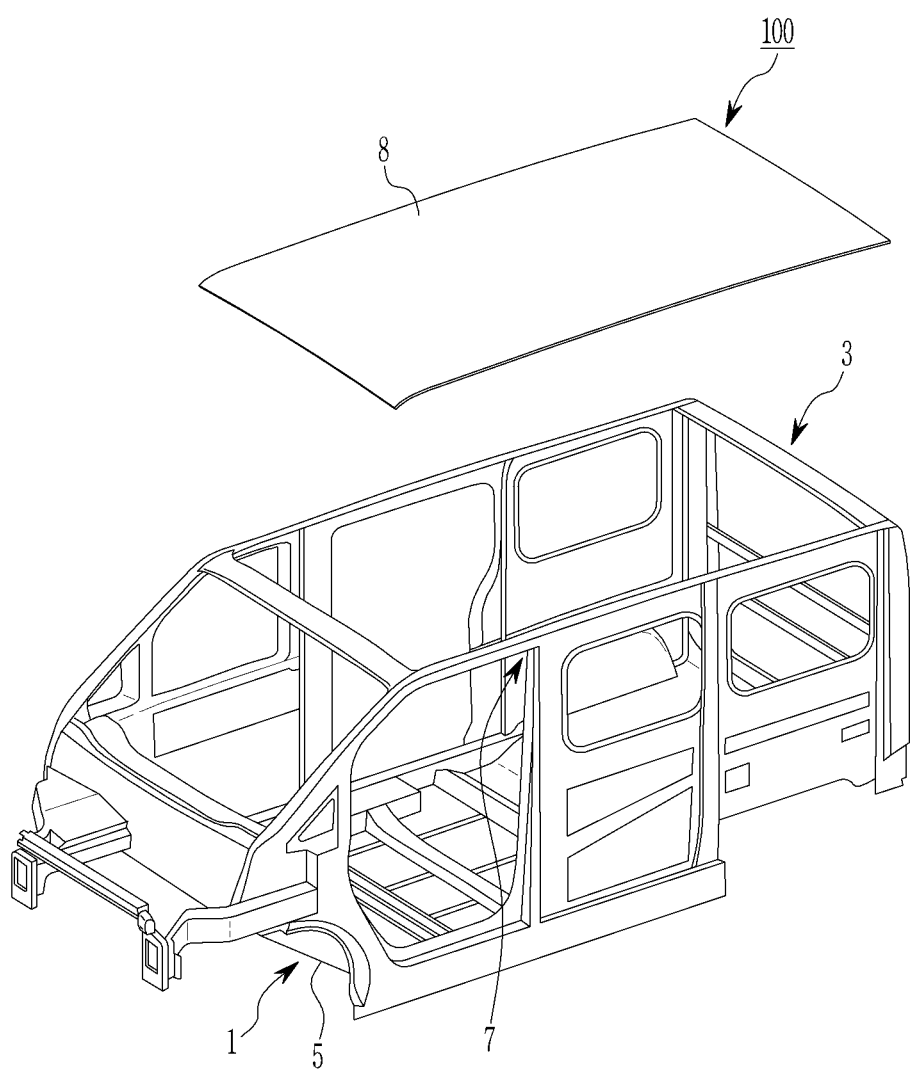
FIG. 1 illustrates an example of a vehicle body applied to an embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

In order to clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown.

Further, in the following detailed description, terms of elements, which are in the same relationship, are divided into "the first", "the second", etc., but the present invention is not necessarily limited to the order in the following description.

Throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", " . . . portion", and " . . . member" described in the specification mean a unit of a comprehensive configuration having at least one function or operation.

FIG. 1 illustrates an example of a vehicle body applied to an embodiment of the present invention.

Referring to FIG. 1, a plastic composite material panel 100 according to an embodiment of the present invention may be applied to a vehicle body of, for example, an electric vehicle-based purpose built vehicle (PBV).

Here, the PBV may be an environment-friendly vehicle that provides a customized service required for an occupant during a time it takes to travel on the ground to a destination. The PBV may set the optimal path for each situation, enable group driving, and furthermore, may be a box-type of vehicle with a large interior space.

The vehicle body of the PBV may include an underbody 1 of a skateboard type and an upper body 3 mounted on the underbody 1.

The underbody 1 is also referred to as a rolling chassis in the art, and may include a chassis frame 5 on which a battery assembly (not shown in the drawing) may be mounted.

In addition, the upper body 3 is a body coupled onto the underbody 1, and may include a vehicle body frame 7 forming a cabin.

In the art, a vehicle width direction (full width direction) is referred to as an L direction, a vehicle body length direction (front/rear direction or full length direction of a vehicle body) is referred to as a T direction, and a height direction of a vehicle body is referred to as an H direction. However, in the embodiment of the present invention, instead of setting the L, T, and H directions as described above as the reference directions, the following constituent elements will be described by setting the reference directions to a vehicle width direction, a vehicle body front/rear direction, and a vertical direction.

In addition, hereinafter, an end (one side end or the other end) may be defined as any one end, or may be defined as a predetermined portion (one end portion or the other end portion) including the end.

Meanwhile, the vehicle body frame 7 of the upper body 3 may include a side assembly assembled to the chassis frame 5 of the underbody 1 and a roof assembly assembled to the side assembly. Here, an outer panel made of a steel material and a plurality of outer panels made of a plastic composite material may be assembled to the side assembly of the vehicle body frame 7.

The plastic composite material panel 100 according to the embodiment of the present invention may be bonded to the vehicle body frame 7.

Furthermore, the plastic composite material panel 100 according to the embodiment of the present invention may be configured of a roof panel 8 bonded to the roof assembly of the vehicle body frame 7 through an adhesive.

The plastic composite material panel 100 according to the embodiment of the present invention described above may minimize the application portion of the plurality of outer panels of the plastic composite material assembled to the side assembly of the vehicle body frame 7, and may have a structure with good formability and increased rigidity.

Figure 2:
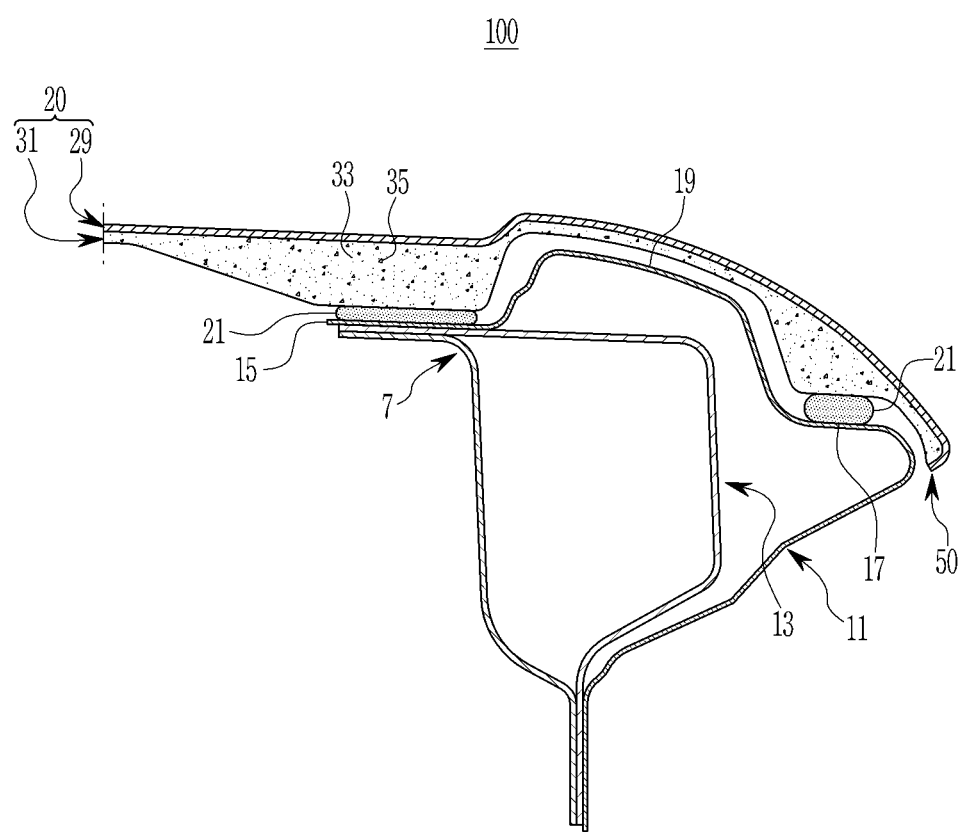
FIG. 2 illustrates a cross-sectional view of an assembly structure of a plastic composite material panel according to an embodiment of the present invention.
Figure 3:
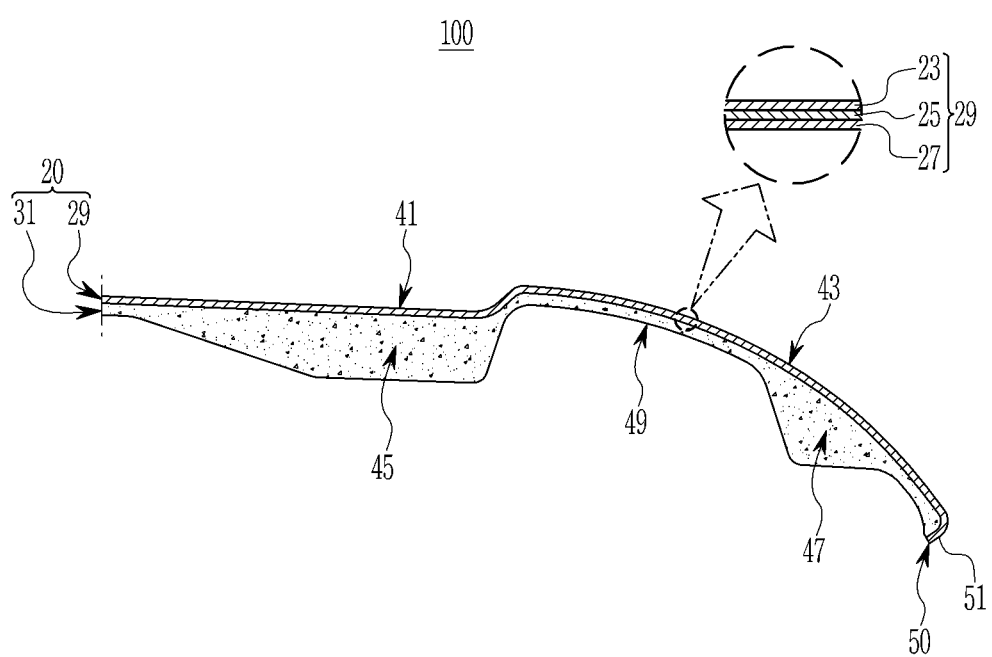
FIG. 3 illustrates a cross-sectional view of a plastic composite material panel according to an embodiment of the present invention.

FIG. 2 illustrates a cross-sectional view of an assembly structure of a plastic composite material panel according to an embodiment of the present invention, and FIG. 3 illustrates a cross-sectional view of a plastic composite material panel according to an embodiment of the present invention.

Referring to FIG. 2 and FIG. 3, the plastic composite material panel 100 according to the embodiment of the present invention includes a roof plate portion 20 and a material filling portion 50.

In the embodiment of the present invention, the roof plate portion 20 is provided as a plate assembled to a roof assembly of the vehicle body frame 7, and is bonded to the vehicle body frame 7 through an adhesive 21.

In one example, the roof plate portion 20 may be bonded to a side outer panel 11 of a steel material provided in the vehicle body frame 7 through the adhesive 21.

Here, the side outer panel 11 of the steel material is bonded to the roof side 13 in the vehicle body frame 7. The side outer panel 11 of the steel material includes a bonding flange 15 bonded to a roof side 13 and a first protrusion portion 17 protruding in a vehicle width direction.

In another example, the roof plate portion 20 includes a molding sheet 29 in which a plurality of resin layers 23, 25, and 27 are stacked, and a reinforcing layer 31 formed on the molding sheet 29.

A plurality of resin layers 23, 25, and 27 may be stacked by a co-extrusion apparatus that is well known to those skilled in the art. The plurality of resin layers 23, 25, and 27 described above include a first resin layer 23, a second resin layer 25, and a third resin layer 27 that are sequentially stacked in a direction from an upper portion to a lower portion of the roof plate portion 20.

For example, the first resin layer 23 may include an acryl-based resin. The first resin layer 23 may be formed as a hard coating layer (commonly referred to as a 'clear layer' by those skilled in the art).

The second resin layer 25 may include a poly(methyl methacrylate) (PMMA) resin.

In addition, the third resin layer 27 may include one or more of an acrylonitrile butadiene styrene (ABS) resin, a polycarbonate (PC) resin, and an acrylate styrene acrylonitrile (ASA) resin.

Here, the second resin layer 25 and the third resin layer 27 may have a predetermined color, and the first resin layer 23 may be a transparent hard coating layer.

The reinforcing layer 31 is formed under the molding sheet 29. The reinforcing layer 31 may increase rigidity of the molding sheet 29, and may prevent the molding sheet 29 from being thermally deformed.

In one example, the reinforcing layer 31 may include a polyurethane compound 33 and a fiber material 35. The polyurethane compound 33 may include polyol and isocyanate. The fiber material 35 may include at least one of carbon fiber, glass fiber, and aramid fiber.

The roof plate portion 20 includes a roof skin section 41, a roof extension section 43, a first bonding section 45, a second bonding section 47, and a vehicle body seating section 49.

The roof skin section 41 has a flat upper surface. The roof skin section 41 may be bonded to the side outer panel 11 of the steel material provided in the vehicle body frame 7 through the adhesive 21.

The roof extension section 43 extends outwardly from an edge of the roof skin section 41. In one example, the roof extension section 43 may be provided with a curved parting portion in a rounded shape.

The roof extension section 43 may be bonded to the side outer panel 11 of the steel material provided in the vehicle body frame 7 through the adhesive 21.

The first bonding section 45 is configured to bond the roof skin section 41 to the side outer panel 11 of the steel material through the adhesive 21. The first bonding section 45 is formed in the reinforcing layer 31 under an edge of the roof skin section 41.

The first bonding section 45 is formed to be thicker than an inner portion of the edge of the roof skin section 41. This first bonding section 45 may be bonded to the bonding flange 15 of the side outer panel 11 of the steel material through the adhesive 21.

The second bonding section 47 is configured to bond the roof extension section 43 to the side outer panel 11 of the steel material through the adhesive 21. The second bonding section 47 is formed in the reinforcing layer 31 under an edge of the roof extension section 43.

The second bonding section 47 is formed to be thicker than an inner portion of the edge of the roof extension section 43. This second bonding section 47 may be bonded to the first protrusion portion 17 of the side outer panel 11 of the steel material through the adhesive 21.

In addition, the vehicle body seating section 49 is formed in the roof extension section 43 between the first bonding section 45 and the second bonding section 47. The vehicle body seating section 49 is formed in the reinforcing layer 31 to have a smaller thickness than the first bonding section 45 and the second bonding section 47. The vehicle body seating section 49 is formed to have a groove shape between the first bonding section 45 and the second bonding section 47.

Here, thicknesses of the first bonding section 45 and the second bonding section 47 may be larger than a thickness of the vehicle body seating section 49, and may vary depending on heights of the bonding flange 15 and the first protrusion portion 17 of the side outer panel 11 of the steel material as described above.

This vehicle body seating section 49 may be seated along a vertical direction on a second protrusion portion 19 protruding upward from the side outer panel 11 of the steel material.

As described above, as the vehicle body seating section 49 is seated on the second protrusion portion 19, the plastic composite material panel 100 according to the embodiment of the present invention may be correctly positioned at a predetermined position of the vehicle body frame 7.

That is, when the plastic composite material panel 100 is loaded on the vehicle body frame 7, the vehicle body seating section 49 is seated on the second protrusion portion 19, and the second protrusion portion 19 serves as a stopper for holding the plastic composite material panel 100 through the vehicle body seating section 49.

In the embodiment of the present invention, the material filling portion 50 is intended to improve the moldability of the plastic composite material panel 100 by the mold. The material filling portion 50 is formed at an end of an edge of the roof plate portion 20 by the reinforcing layer 31. Further, the material filling portion 50 is formed at an end of an edge of the roof extension section 43.

Here, the material filling portion 50 may be formed in an undercut portion 51 of an end of an edge of the molding sheet 29 by the reinforcing layer 31. The material filling portion 50 is provided to have a rounded shape in the undercut portion 51. Furthermore, the material filling portion 50 may be provided to have a shape in which a cross-sectional width thereof gradually decreases from an upper side to a lower side.

Hereinafter, a manufacturing method of the plastic composite material panel 100 according to the embodiment of the present invention configured as described above will be described in detail with reference to FIG. 4 to FIG. 8.

FIG. 4 to FIG. 8 are drawings for explaining a manufacturing method of a plastic composite material panel according to an embodiment of the present invention.

Figure 4:
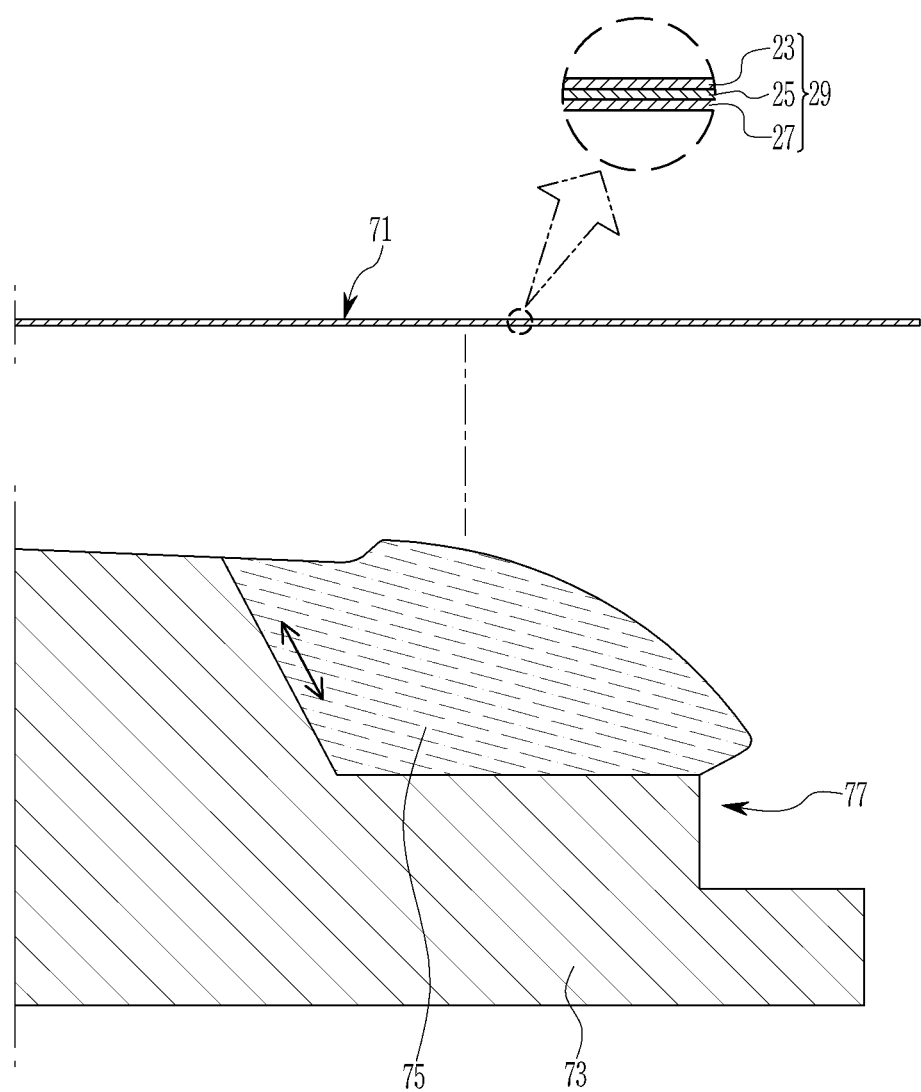
FIG. 4 to FIG. 8 are drawings for explaining a manufacturing method of a plastic composite material panel according to an embodiment of the present invention.

Referring to FIG. 4, a multi-layered sheet 71 in which a plurality of resin layers 23, 25, and 27 are stacked is provided.

The multi-layered sheet 71 may be manufactured by a co-extrusion apparatus that is well known to those skilled in the art. The co-extrusion apparatus may stack the plurality of resin layers 23, 25, and 27 that are co-extruded in a molten state.

Next, a thermoforming mold 77 including a fixed die 73 and at least one first sliding die 75 is provided. Here, the at least one first sliding die 75 is slidably provided in the fixed die 73 along an oblique direction (for example, an up and down inclination direction).

Here, the multi-layered sheet 71 is separately preheated in a heating chamber (not shown) well known to those skilled in the art. This multi-layered sheet 71 is loaded onto upper surfaces of the fixed die 73 and the at least one first sliding die 75.

Figure 5:
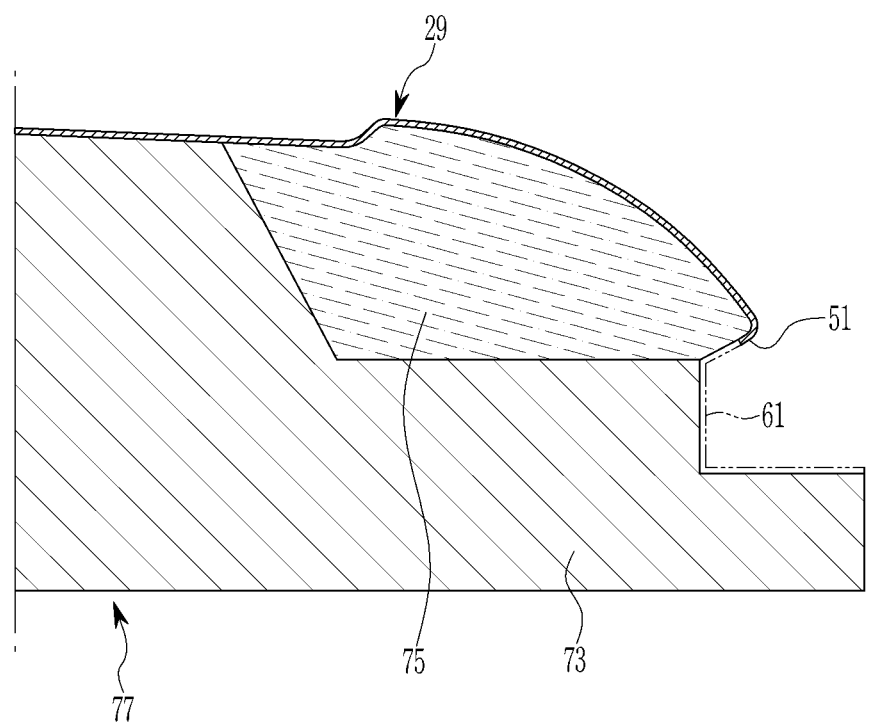

Then, as the multi-layered sheet 71 is in close contact with the molding surfaces of the fixed die 73 and the at least one first sliding die 75 by a suction pressure applied from the thermoforming mold 77, it may be formed into the molding sheet 29 as shown in FIG. 5. The thermoforming mold 77 for thermoforming such a preheated sheet into a set shape is well known to those skilled in the art, so a further detailed description thereof will be omitted.

The molding sheet 29 molded as described above has an undercut portion 51 and an extension 61 extending from the undercut portion 51 (shown as a double-dot chain line in the drawing) formed at an edge portion thereof by a molding surface of at least one first sliding die 75.

Here, the extension 61 is a portion that extends from the undercut portion 51 to be in close contact with the fixed die 73 and the at least one first sliding die 75, and it may be formed as a dummy portion positioned at the edge of the molding sheet 29.

Figure 6:
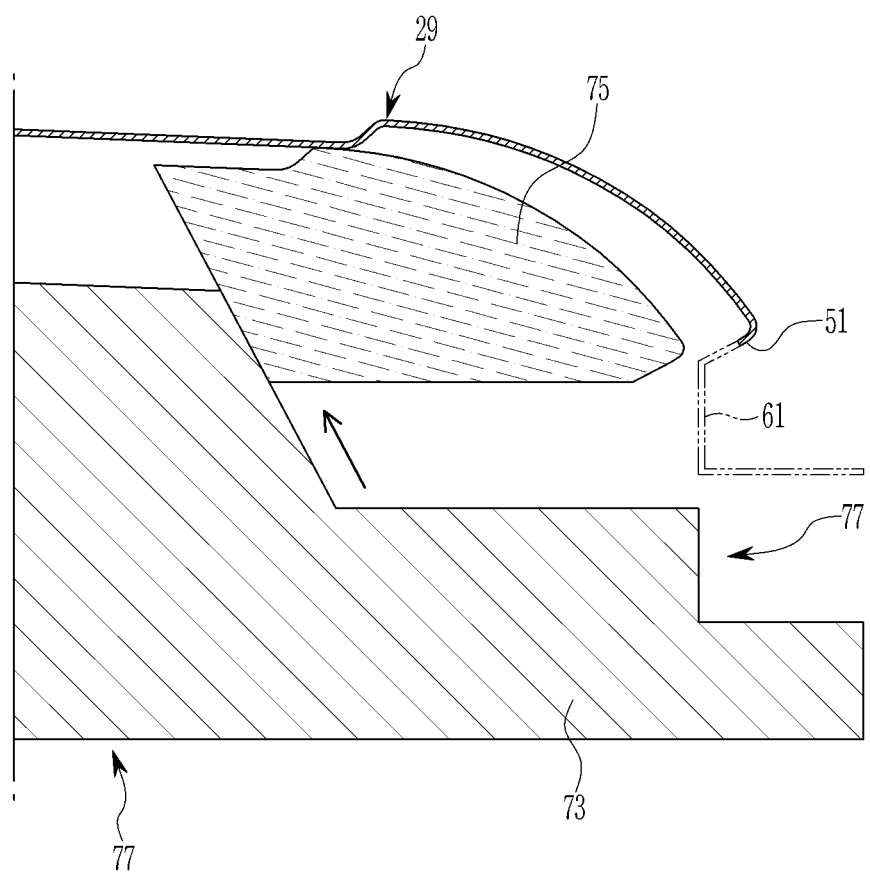

In this state, as shown in FIG. 6, the at least one first sliding die 75 is slid upward along the oblique direction in the fixed die 73. Then, the molding sheet 29 may be separated from the molding surfaces of the fixed die 73 and the at least one first sliding die 75 to be smoothly taken out in the upward direction.

Then, when the extension 61 of the molding sheet 29 (shown as a double-dot chain line in the drawing) is removed through post processing (for example, milling or ultrasonic wave processing, and the like), the molding of the molding sheet 29 in which the undercut portion 51 is formed at the edge end is completed.

Figure 7:
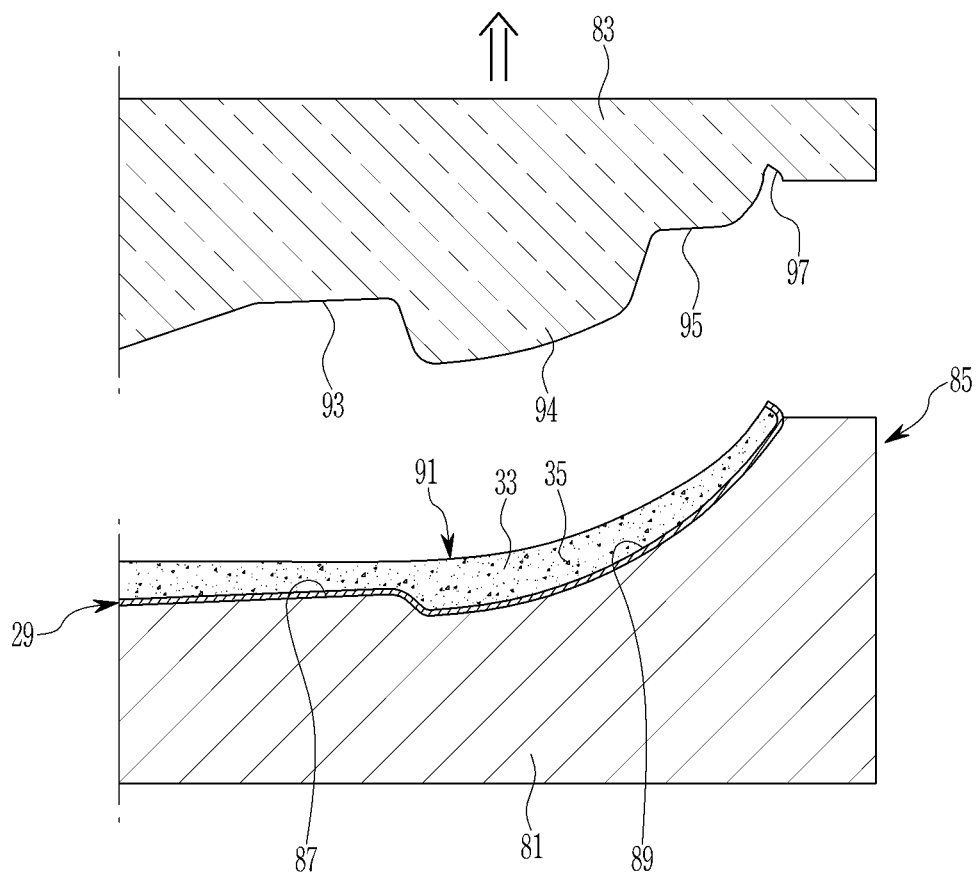

As described above, when the molding of the molding sheet 29 is completed through the thermoforming mold 77, as shown in FIG. 7, a press molding mold 85 including a lower die 81 and an upper die 83 is provided. Here, the upper die 83 is provided to be movable in the vertical direction corresponding to the lower die 81.

The molding sheet 29 is loaded onto an upper surface of the lower die 81. In this case, the upper die 83 is in a state of being moved upward in correspondence to the lower die 81.

Here, the lower die 81 includes a first molding surface 87 configured to mold the roof skin section 41 of the roof plate portion 20 and a second molding surface 89 configured to mold the roof extension section 43 thereof.

In a state in which the molding sheet 29 is loaded on the lower die 81, a reinforcing source 91 containing the polyurethane compound 33 and the fiber material 35 is applied to the upper surface of the molding sheet 29.

In this case, the reinforcing source 91 may be sprayed onto the upper surface of the molding sheet 29 through a spray head mounted on an arm of a handling robot (not shown) that are well known to those skilled in the art.

Figure 8:
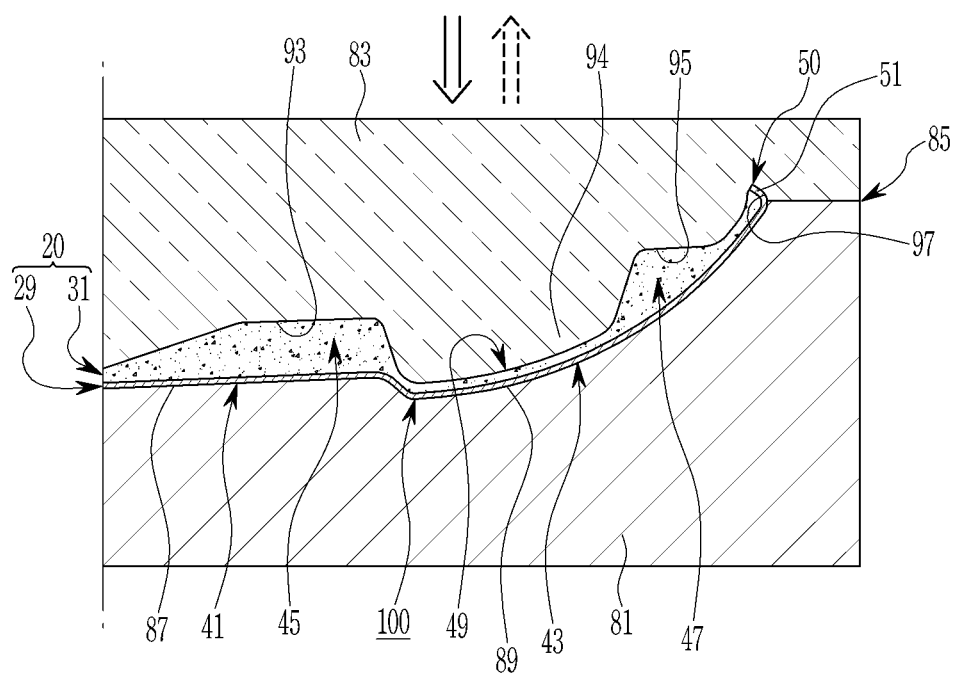

Next, as shown in FIG. 8, the upper die 83 is moved in the lower direction corresponding to the lower die 81. Accordingly, the upper die 83 is combined with the lower die 81 to press the molding sheet 29 coated with the reinforcing source 91, so that the roof plate portion 20 in which the reinforcing layer 31 is formed on the molding sheet 29 is molded.

The upper die 83 includes a first molding groove 93, a second molding groove 95, and a third molding groove 97. Each of the first molding groove 93, the second molding groove 95, and the third molding groove 97 is formed along the vertical direction.

Here, the first molding groove 93 is configured to mold the first bonding section 45 of the roof plate portion 20 while the reinforcing source 91 is introduced. The second molding groove 95 is configured to mold the second bonding section 47 while the reinforcing source 91 is introduced. In addition, the third molding groove 97 is configured to mold the material filling portion 50 in the undercut portion 51 of the molding sheet 29 while the reinforcing source 91 is introduced. Furthermore, in the upper die 83, between the first molding groove 93 and the second molding groove 95, a molding protrusion 94 configured to mold the vehicle body seating section 49 is formed along the vertical direction.

Accordingly, the press molding mold 85 may mold the plastic composite material panel 100 in which the roof skin section 41, the roof extension section 43, the first bonding section 45, the second bonding section 47, the vehicle body seating section 49, and the material filling portion 50 are integrally formed in the roof plate portion 20.

In the state in which the plastic composite material panel 100 according to the embodiment of the present invention is molded as described above, the upper die 83 is upwardly moved, and is released from the lower die 81.

Accordingly, the plastic composite material panel 100 according to the embodiment of the present invention may be taken out from the lower die 81 along the upper direction. Here, the plastic composite material panel 100 may be smoothly taken out from the lower die 81 by the material filling portion 50 formed in the undercut portion 51 of the molding sheet 29.

The plastic composite material panel 100 according to the embodiment of the present invention as described so far includes the roof plate portion 20 in which the roof skin section 41, the roof extension section 43, and the material filling portion 50 are formed.

Accordingly, according to the embodiments of the present invention, it is possible to minimize the application portions of a plurality of outer panels of the plastic composite material assembled to the side assembly of the vehicle body frame 7. Therefore, according to the embodiments of the present invention, it is possible to realize the cost reduction and the simplification of the assembly process.

Furthermore, according to the embodiments of the present invention, by configuring the roof plate portion 20 in which the reinforcing layer 31 is formed on the molding sheet 29, it is possible to increase the rigidity of the plastic composite material panel 100 and to minimize thermal deformation.

Furthermore, according to the embodiments of the present invention, the molding sheet 29 may be smoothly taken out from the thermoforming mold 77, and the plastic composite material panel 100 may be smoothly taken out from the press molding mold 85. Therefore, according to the embodiments of the present invention, it is possible to improve the moldability of the plastic composite material panel 100.

FIG. 9 to FIG. 14 are drawings for explaining a manufacturing method of a plastic composite material panel according to another embodiment of the present invention.

Figure 9:
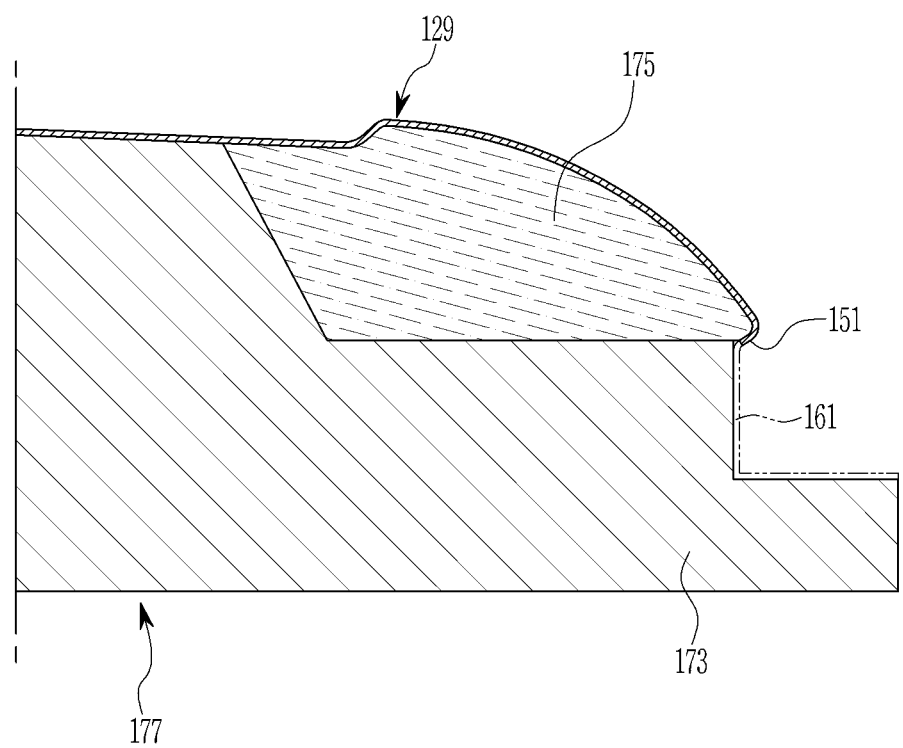
FIG. 9 to FIG. 14 are drawings for explaining a manufacturing method of a plastic composite material panel according to another embodiment of the present invention.
Figure 10:
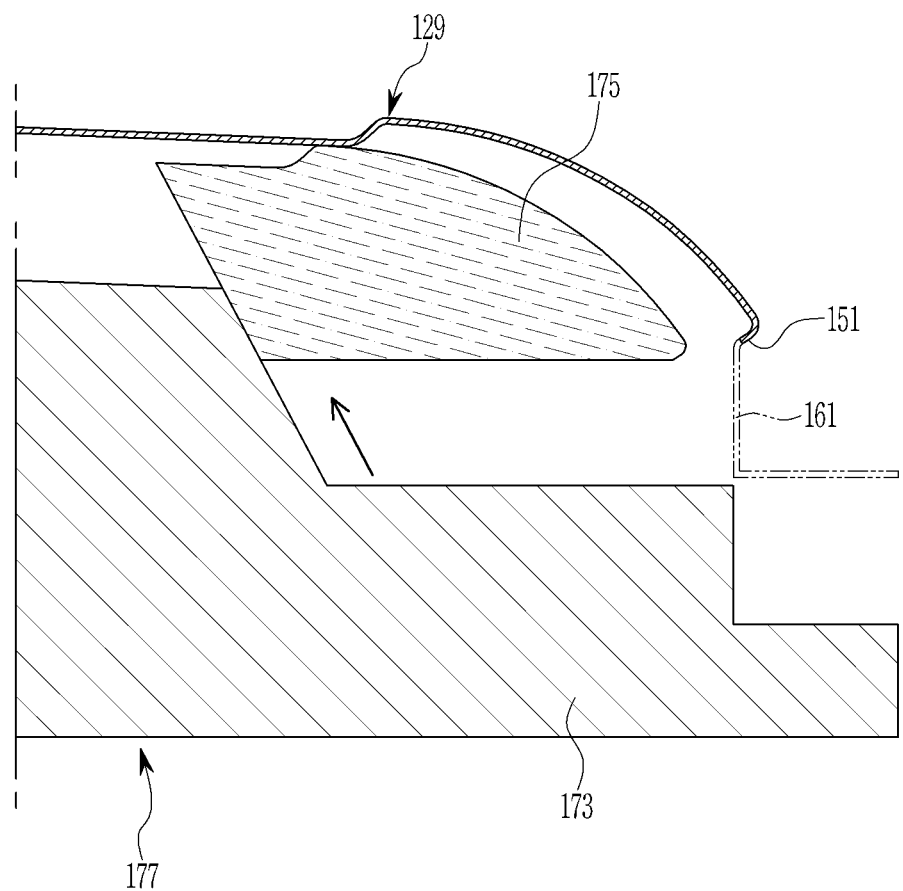

Referring to FIG. 9 and FIG. 10, first, according to the manufacturing method of the plastic composite material panel according to another embodiment of the present invention, as in the previous embodiment, a molding sheet 129 molded by a thermoforming mold 177 including a fixed die 173 and at least one first sliding die 175 is provided.

The molding sheet 129 molded as described above has an undercut portion 151 and an extension 161 extending from the undercut portion 151 (shown as a double-dot chain line in the drawing) formed at an edge portion thereof by a molding surface of at least one first sliding die 175.

Figure 11:
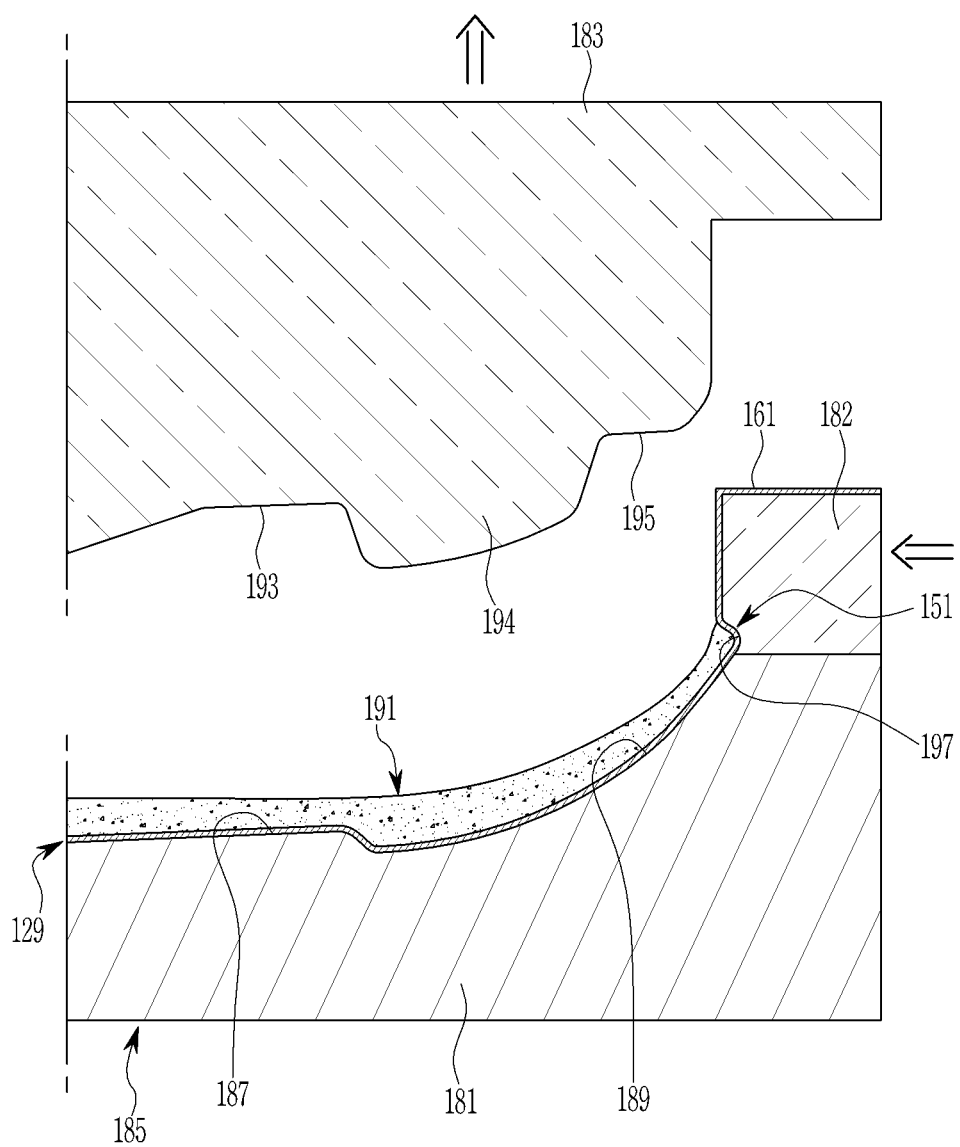

As described above, when the molding of the molding sheet 129 is completed, as shown in FIG. 11, a press molding mold 185 including a lower die 181 and an upper die 183 is provided.

The lower die 181 includes at least one second sliding die 182 that is slidably installed in a horizontal direction (for example, a left-right direction based on the drawing).

Here, the at least one second sliding die 182 is configured to support the undercut portion 151 and the extension 161 of the molding sheet 129. In addition, the upper die 183 is provided to be reciprocally movable in the vertical direction at a position corresponding to the lower die 181.

Next, in a state in which the upper die 183 is upwardly moved from a position corresponding to the lower die 181, the molding sheet 129 is loaded on the lower die 181 and the at least one second sliding die 182. In this case, the at least one second sliding die 182 is moved forward along the horizontal direction to support the undercut portion 151 and the extension 161 of the molding sheet 129.

Figure 12:
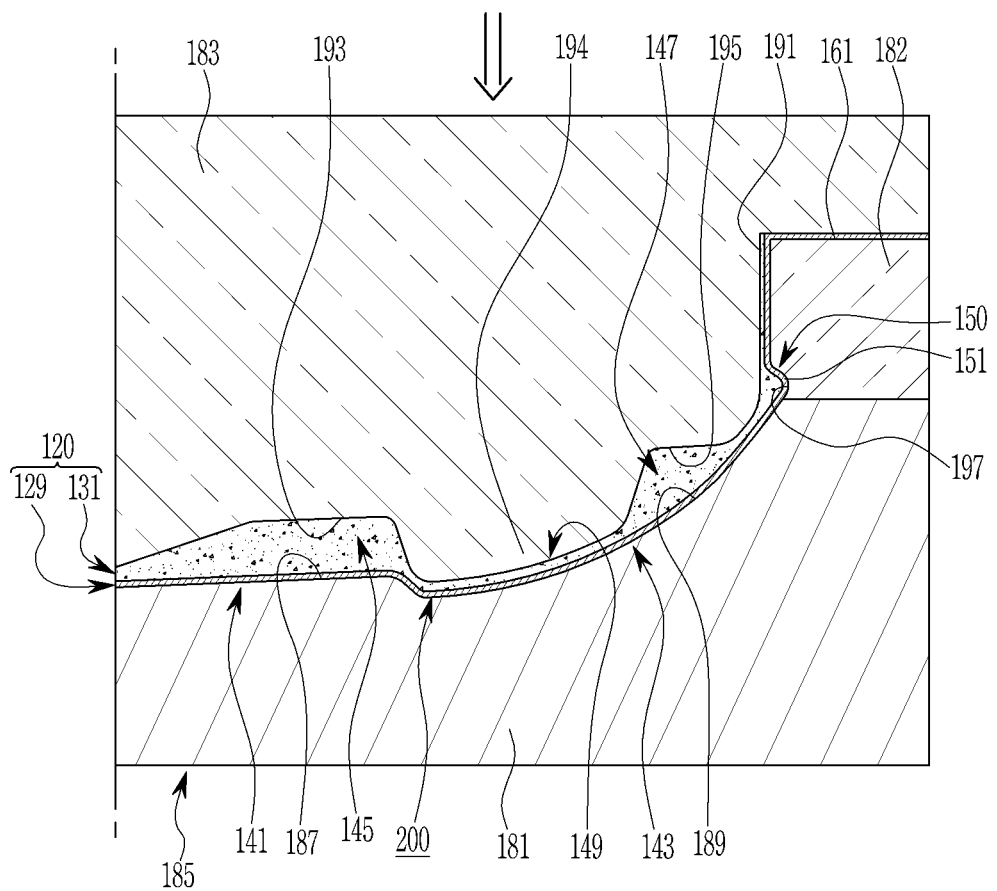
Figure 13:
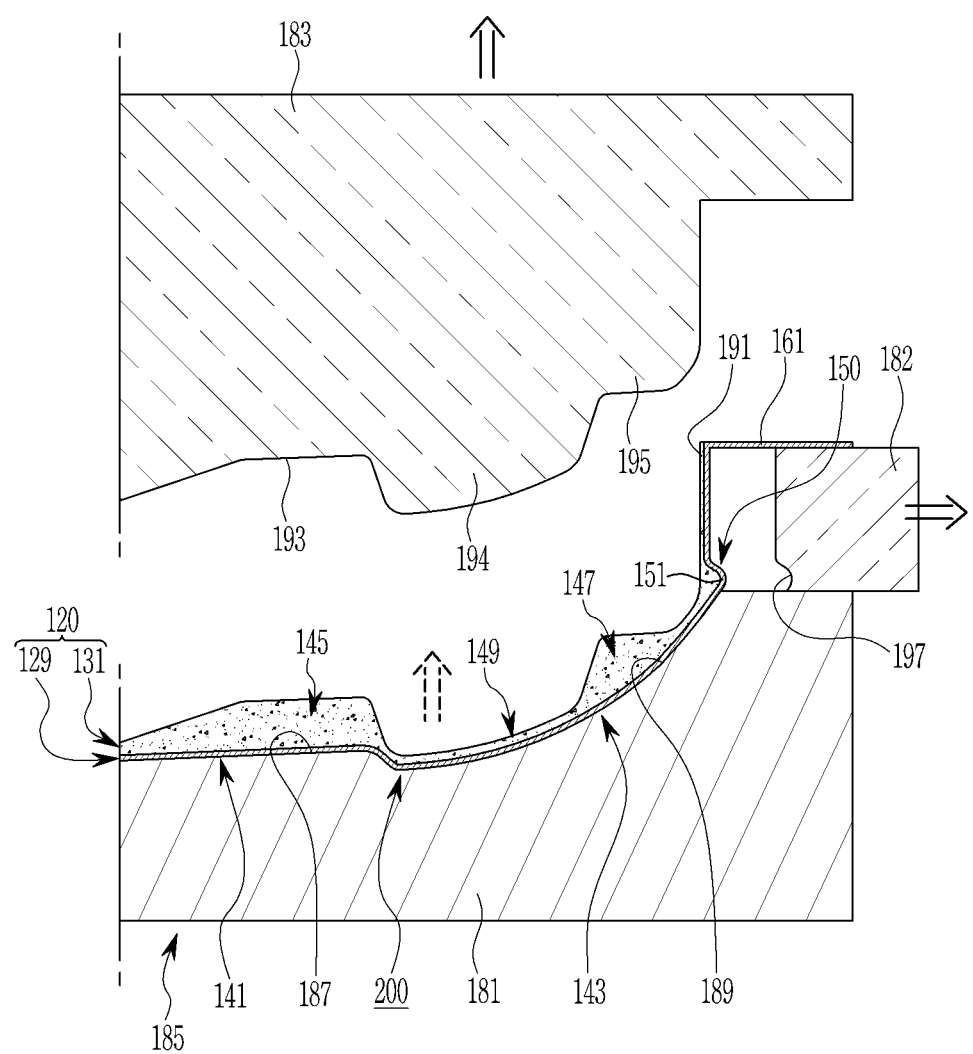

Further, the lower die 181 includes a first molding surface 187 configured to mold a roof skin section 141 (see FIG. 12 and FIG. 13) of a roof plate portion 120 (see FIG. 12 and FIG. 13) and a second molding surface 189 configured to mold a roof extension section 143 (see FIG. 12 and FIG. 13).

In a state in which the molding sheet 129 is loaded on the lower die 181 as described above, a reinforcing source 191 is applied to the upper surface of the molding sheet 129. Here, the reinforcing source 191 may be applied from the upper surface of the molding sheet 129 to the undercut portion 151.

Then, as shown in FIG. 12, the upper die 183 is moved in a downward direction at a position corresponding to the lower die 181. Accordingly, the upper die 183 is combined with the lower die 181 and at least one second sliding die 182 to press the molding sheet 129 coated with the reinforcing source 191 (see FIG. 11), so that the roof plate portion 120 in which the reinforcing layer 131 is formed on the molding sheet 129 is molded.

Here, the upper die 183 includes a first molding groove 193 and a second molding groove 195. In addition, the at least one second sliding die 182 includes a third molding groove 197.

The first molding groove 193 is configured to mold the first bonding section 145 of the roof plate portion 120 while the reinforcing source 191 (see FIG. 11) is introduced. The second molding groove 195 is configured to mold the second bonding section 147 while the reinforcing source 191 (see FIG. 11) is introduced.

In addition, the third molding groove 197 is configured to mold the material filling portion 150 in which the reinforcing source 191 (see FIG. 11) is introduced into the undercut portion 151 of the molding sheet 129. Here, the third molding groove 197 is configured to support the undercut portion 151.

Furthermore, in the upper die 183, between the first molding groove 193 and the second molding groove 195, a molding protrusion 194 configured to mold the vehicle body seating section 149 is formed.

Accordingly, the press molding mold 185 may mold the plastic composite material panel 200 in which the roof skin section 141, the roof extension section 143, the first bonding section 145, the second bonding section 147, the vehicle body seating section 149, and the material filling portion 150 are integrally formed in the roof plate portion 120.

Here, the reinforcing source 191 may be introduced between the upper die 183 and the at least one second sliding die 182, and may be applied to a portion of the extension 161 of the molding sheet 129.

Next, as shown in FIG. 13, the upper die 183 is moved in the upper direction, and is released from the lower die 181.

In this process, the at least one second sliding die 182 is moved backward along the horizontal direction. Thus, the at least one second sliding die 182 is spaced apart from the undercut portion 151 and the extension 161 of the molding sheet 129.

Accordingly, the plastic composite material panel 200 may be smoothly taken out (for example, ejected) from the lower die 181 in the upper direction without interfering with the at least one second sliding die 182.

Figure 14:
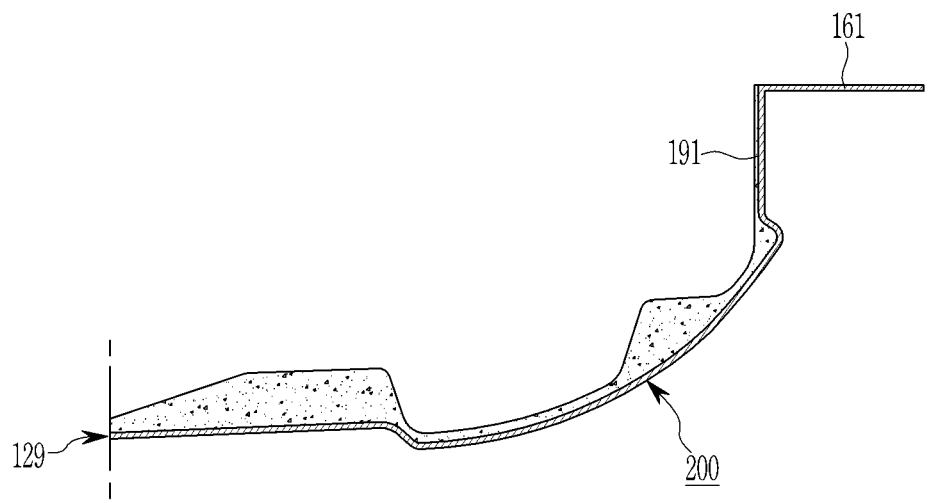
Figure 14:
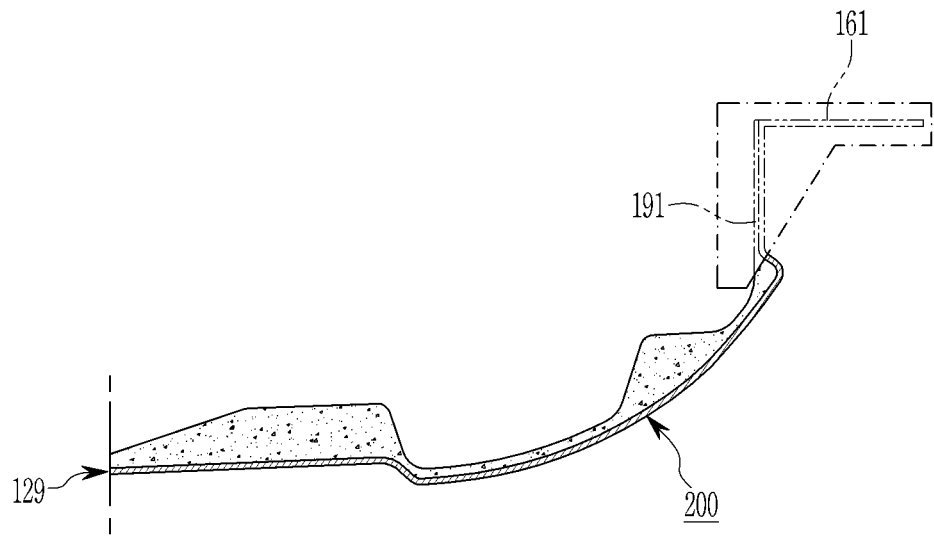

Then, as shown in FIG. 14, the extension 161 of the molding sheet 129 to which the reinforcing source 191 is partially applied is removed from the plastic composite material panel 200 through post processing (for example, milling processing or ultrasonic wave processing).

That is, as shown by a solid line in FIG. 14(a), the extension 161 to which the reinforcing source 191 is partially applied may be removed by post-processing as shown by a double-dot chain line in FIG. 14(b).

The remaining configuration and effect the molding method of the plastic composite material panel according to another embodiment of the present invention as described above are the same as the previous embodiment, so a detailed description thereof will be omitted.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A plastic composite material panel, comprising:
   a roof plate portion that includes a molding sheet on which a plurality of resin layers are stacked, and a reinforcing layer formed on the molding sheet and that is designed to be bonded to a vehicle body frame; and
   a material filling portion formed at an end of an edge of the roof plate portion by the reinforcing layer,
   wherein:
      the roof plate portion further comprises:
         a roof skin section; and
         a roof extension section that extends from an edge of the roof skin section and in which the material filling portion is formed, and
         the roof extension section is provided with a curved parting portion in a rounded shape.

2. The plastic composite material panel of claim 1, wherein the material filling portion is formed in an undercut portion of an end of an edge of the molding sheet.

3. The plastic composite material panel of claim 1, wherein the roof plate portion comprises:
   a first bonding section formed on the reinforcing layer at a lower portion of the edge of the roof skin section and bonded to the vehicle body frame through an adhesive, and
   a second bonding section formed on the reinforcing layer at a lower portion of an edge of the roof extension section and bonded to the vehicle body frame through an adhesive.

4. The plastic composite material panel of claim 3, wherein the roof plate portion further comprises a vehicle body seating section that is formed in the reinforcing layer to have a smaller thickness than the first bonding section and the second bonding section and is formed between the first bonding section and the second bonding section in the roof extension section.

5. The plastic composite material panel of claim 4, wherein the vehicle body seating section is seated on a protrusion portion protruding upward from the vehicle body frame.

6. The plastic composite material panel of claim 1, wherein the reinforcing layer includes a polyurethane compound and a fiber material.

7. A vehicle comprising:
   the vehicle body frame; and
   the plastic composite material panel of claim 1, wherein the reinforcing layer formed is bonded to the vehicle body frame.

* * * * *